United States Patent

Inaoka et al.

[11] Patent Number: 6,145,691
[45] Date of Patent: Nov. 14, 2000

[54] FUEL TANK

[75] Inventors: Hiroshi Inaoka; Ryuta Itou, both of Saitama; Teiji Watanabe; Joji Fujinami, both of Shizuoka, all of Japan

[73] Assignee: Honda Giken Kogyo Kabushiki Kaisha, Tokyo, Japan

[21] Appl. No.: 09/346,702

[22] Filed: Jul. 2, 1999

Related U.S. Application Data

[62] Division of application No. 09/019,987, Feb. 6, 1998.

[30] Foreign Application Priority Data

Feb. 6, 1997 [JP] Japan .................................. 9-024103

[51] Int. Cl.[7] ........................................................ B65D 6/02
[52] U.S. Cl. ........................... 220/562; 220/4.14; 220/608
[58] Field of Search .................................... 220/562, 612, 220/678, 680, 905, 608, DIG. 13, 4.14; 280/833, 834, 835

[56] References Cited

U.S. PATENT DOCUMENTS

| | | |
|---|---|---|
| 1,485,555 | 3/1924 | Daykin . |
| 2,168,615 | 8/1939 | Bernstein . |
| 2,503,792 | 4/1950 | Brandon . |
| 4,449,723 | 5/1984 | Shiratsuchi ................... 280/833 |
| 4,469,190 | 9/1984 | Yamaguchi .................... 180/219 |
| 4,648,474 | 3/1987 | Shinozaki et al. ............. 180/68.1 |
| 4,913,256 | 4/1990 | Sakuma ........................ 180/229 |
| 5,542,706 | 8/1996 | Kubly . |
| 5,626,776 | 5/1997 | Morris, Jr. ................... 219/121.64 |

FOREIGN PATENT DOCUMENTS

| | | |
|---|---|---|
| 616244 | 1/1927 | France . |
| 914941 | 7/1954 | Germany . |
| 647572 | 2/1994 | Japan . |
| 252860 | 6/1926 | United Kingdom ............ 220/4.14 |

*Primary Examiner*—Stephen Castellano
*Attorney, Agent, or Firm*—Birch, Stewart, Kolasch & Birch, LLP

[57] ABSTRACT

A fuel tank has a superior outer appearance. A body and a bottom are aligned to each other in a vertical direction to form a sealed closed space for storing fuel between both members. The body is formed as a container having an opening in a downward direction. A connected end part is bent inward in a continuous manner from a lower end of its outer surface. The opening is covered from below with the bottom and its circumferential edge is overlapped on the connected end while its position is set and connected at its entire circumference by brazing.

13 Claims, 7 Drawing Sheets

FUEL TANK

This application is a divisional of co-pending application Ser. No. 09/019,987, filed on Feb. 6, 1998, the entire contents of which are hereby incorporated by reference.

BACKGROUND OF THE INVENTION

1. Field of the Invention

The present invention relates to a fuel tank, and more particularly, to a fuel tank having a visually pleasing outer appearance for use on a motorized vehicle such as a motorcycle or motorbike.

2. Description of the Background Art

Japanese Patent Laid-Open No. Hei 6-47572 discloses a method for manufacturing a fuel tank for a motorized vehicle in which a body and a bottom are aligned in the vertical direction to form a sealed space. Each of the body and the bottom is formed with an outwardly directed flange around the entire circumference. These outwardly directed flanges are overlapped with one another in the vertical direction, and are connected together by a laser welding process.

Since the fuel tank for a motorized vehicle is frequently a visible parts, it is preferable for the outwardly directed flange of the prior art to be arranged in such a way that it cannot be seen from the outside as much as possible. However, in the case where the fuel tank is assembled by welding with a press melting method, such as seam welding or laser welding, an outwardly directed flange becomes essential, although such an outwardly directed flange is projected toward an outer circumferential side of the fuel tank, making it quite difficult for the outwardly directed flange to be prevented from being seen from the outside.

SUMMARY OF THE INVENTION

In order to solve the aforesaid problems, the fuel tank of the present invention is made such that a body and a bottom are aligned with each other in the vertical direction to form a sealed closed space, wherein the body is formed as a container having an opening in a downward direction. An end part of the body encloses this opening, and is bent inwardly in a continuous manner from a lower end of its outer surface to form an entire circumferential connected end. A circumferential edge of the bottom is overlapped on the connected end and connected along its entire circumference.

It is possible that a part of the connected end is formed at a portion bent back inwardly to be directed upward in a continuous manner from the lower end of the major outer appearance surface of the body. As one example of the connected end in this case, the lower end of the major outer appearance surface of the body is bent back inwardly to form a tapered shape in such a way that its extremity end is slanted upwardly.

The major outer appearance surface in this case is defined as a surface which is most easily seen from outside in its applied form and applied for evaluation for outer appearance. In the case of the fuel tank for a motorized vehicle, for example, it is frequently found that the upper surface, and both right and left side surfaces, may act as the major outer appearance surface.

Further, in the present invention, it is possible to arrange a position setting means near the connected part between the connected end of the body and the circumferential edge of the bottom. Additionally, the connected end part of the body and the circumferential edge of the bottom can be connected by brazing or welding.

The end part of the body enclosing the opening section is bent inwardly from a lower end section of an outer surface in a continuous manner to apply a connecting end of an entire circumference. The circumferential edge part of the bottom is pushed against the connected end part from below the body and the circumferential edge of the body is connected to the connected end part of the body at its entire circumference. The result is that the connected part is positioned at the lower side of the body, and it is scarcely seen from outside, and the outer appearance is improved.

In particular, when the connected part of the body is bent inwardly from the lower end of the major outer appearance surface in a continuous manner to form a part bent back in an upward direction, the connected part between the connected end part of the body and the circumferential edge part of the bottom is placed inside the major outer appearance surface, and therefore it is not completely visible from outside. The result is that the outer appearance of the fuel tank is improved.

Further, when a position setting means is arranged near the connected part between the circumferential edge of the bottom and the connected end part of the body, the connected end part of the body and the circumferential edge of the bottom can be overlapped and connected accurately without using any particular jigs. Therefore, its workability is improved and an assembling facility can be simplified.

In addition, when the connected end part of the body and the connected part at the circumferential edge of the bottom are connected by brazing or welding, mere overlapping of the circumferential edge of the bottom part on the inwardly bent connected end of the body enables the welding operation to be carried out without press-contacting the welding part from each side, resulting in the connected end part of the body and the circumferential edge part of the bottom being welded and connected easily and positively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

One preferred embodiment of the invention will be described with reference to FIGS. 1 to 7. In these figures, the fuel tank of the preferred embodiment is made such that a body 1 and a bottom member 2 are connected in a vertical direction, and a sealed closed space for storing fuel is formed between both members.

Figure 4:
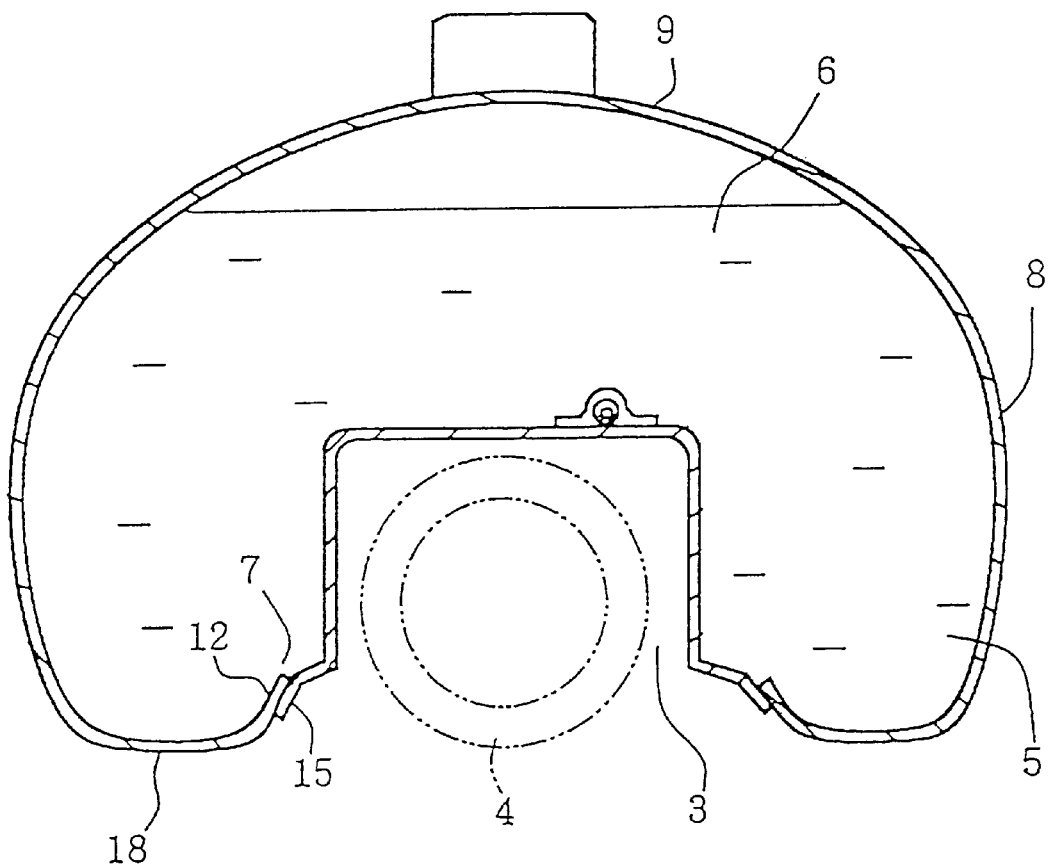
FIG. 4 is a cross-sectional view taken along line 4—4 of FIG. 2.

As shown in FIG. 4, the fuel tank has the form of a saddle, wherein an inverse U-shaped cavity 3 is formed at a central portion along the longitudinal direction. A main frame pipe 4 constituting a body chassis frame of the motorized vehicle passes in the cavity along the longitudinal direction.

Side tank chambers 5 located at the lower part of the fuel tank are divided and formed at both right and left sides of the cavity 3 and are continuous with an upper chamber 6. The body 1 is formed as a container having an opening 7 opening in a downward direction. Both right and left side walls 8 and an upper wall 9 become the major visible outer surfaces.

In addition, a connected end part 12 defined by inwardly directed connecting walls is bent in a substantial right angle in a continuous manner from each of the lower ends of a front wall 10 and a rear wall 11 of the outer surface toward a central part of the fuel tank, and from each of the right and left side walls 8. The opening defined by peripheral edges of the inwardly directed connecting walls of the connected end part 12.

This connected end part 12 is formed continuously around an entire periphery/circumference enclosing the opening 7. Both right and left side walls 8 are formed such that extreme ends thereof are tapered and bent inside and slant upwardly of the fuel tank.

The bottom member 2 is formed as an inverted substantially U-shaped member with a top part 13 and a vertical wall part 14 in a continuous manner to cover the opening 7 from below, and to substantially cover the entire wall surface of the frame storing cavity 3. The peripheral edge 15 of the bottom member 2 is overlapped at its entire periphery/circumference on the peripheral edge of the inwardly directed connecting walls forming the connected end part 12.

Figure 1:
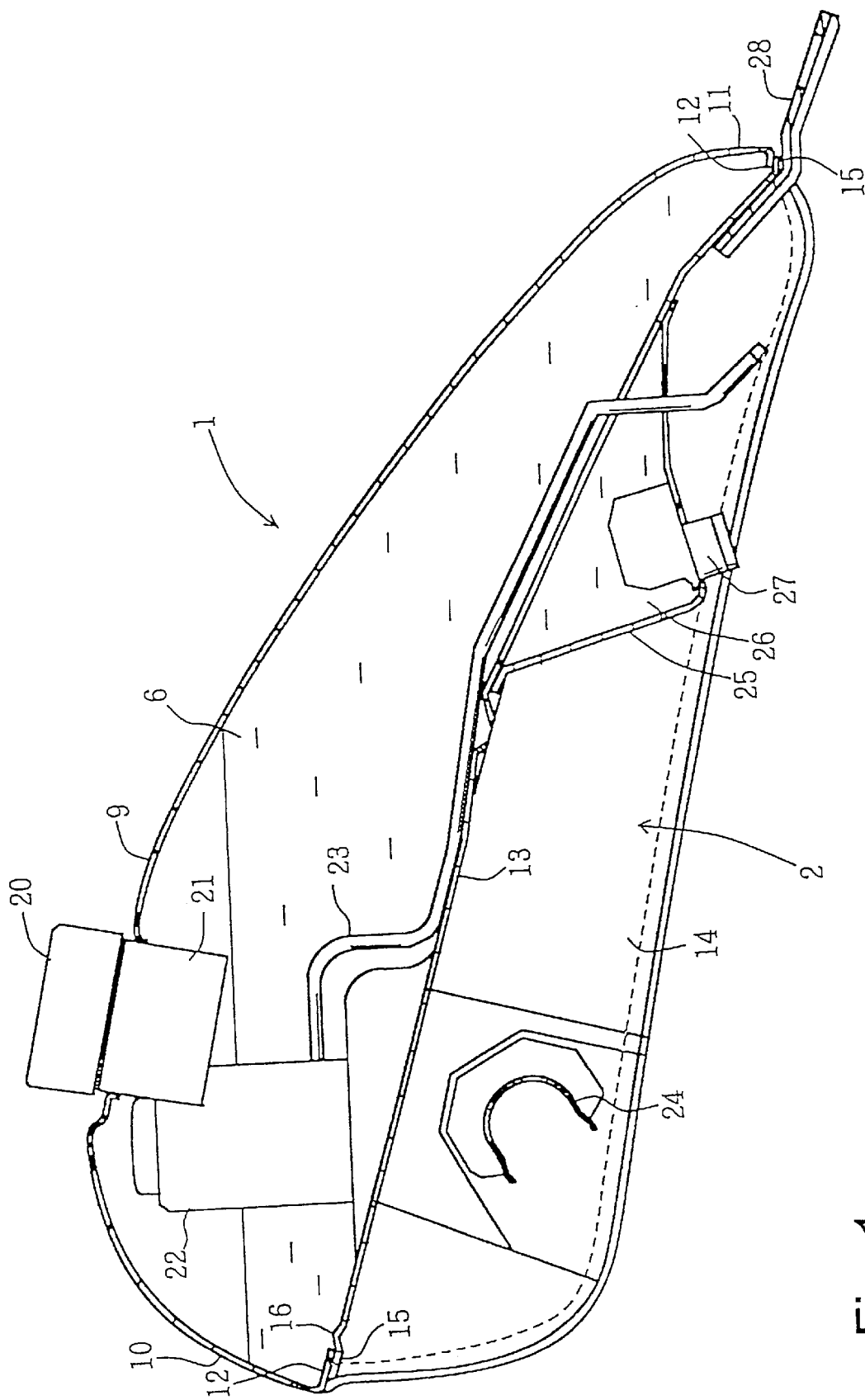
FIG. 1 is a cross-sectional side view of the fuel tank of the present invention.
Figure 2:
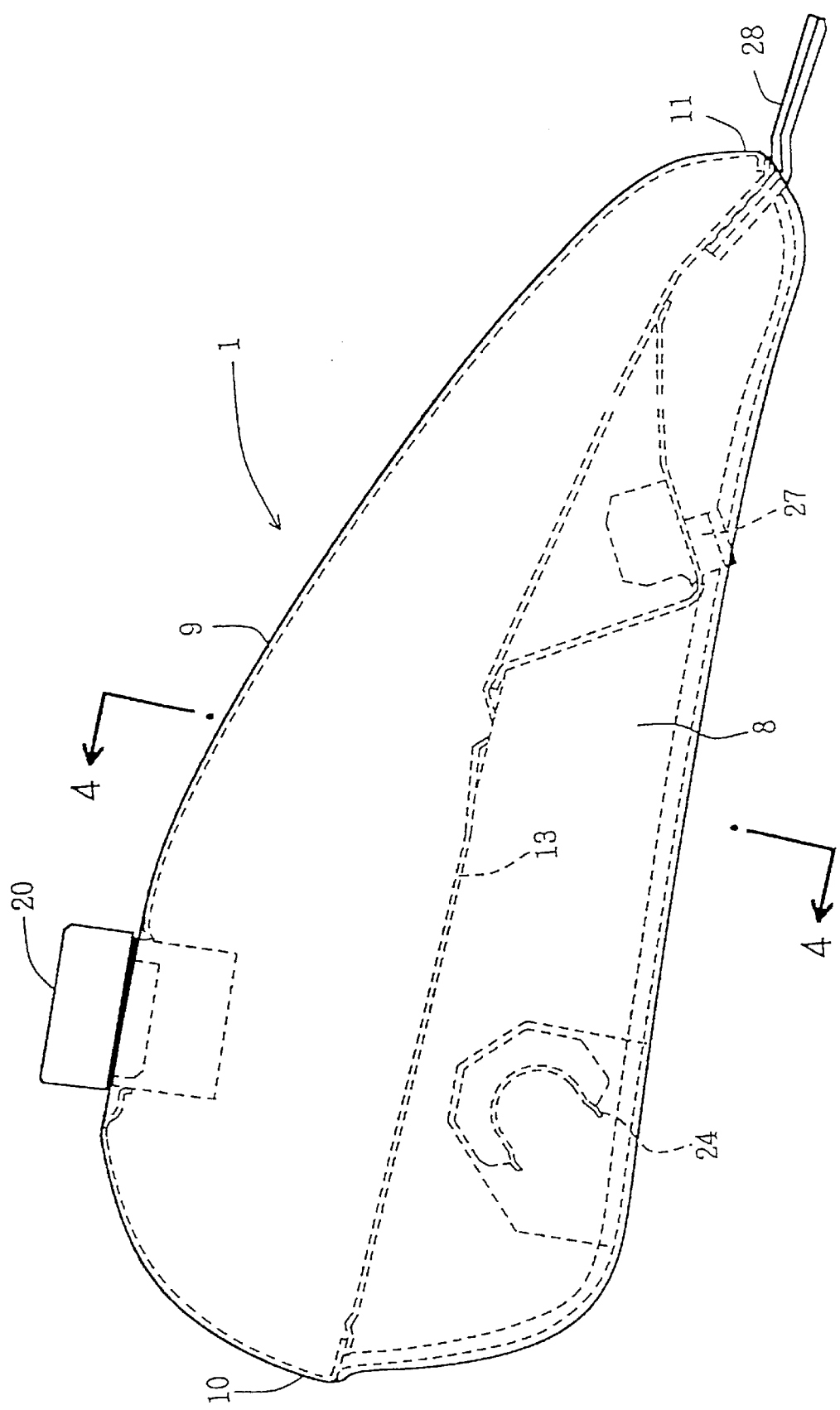
FIG. 2 is a side elevational view showing an outer appearance of the fuel tank of the present invention.
Figure 3:
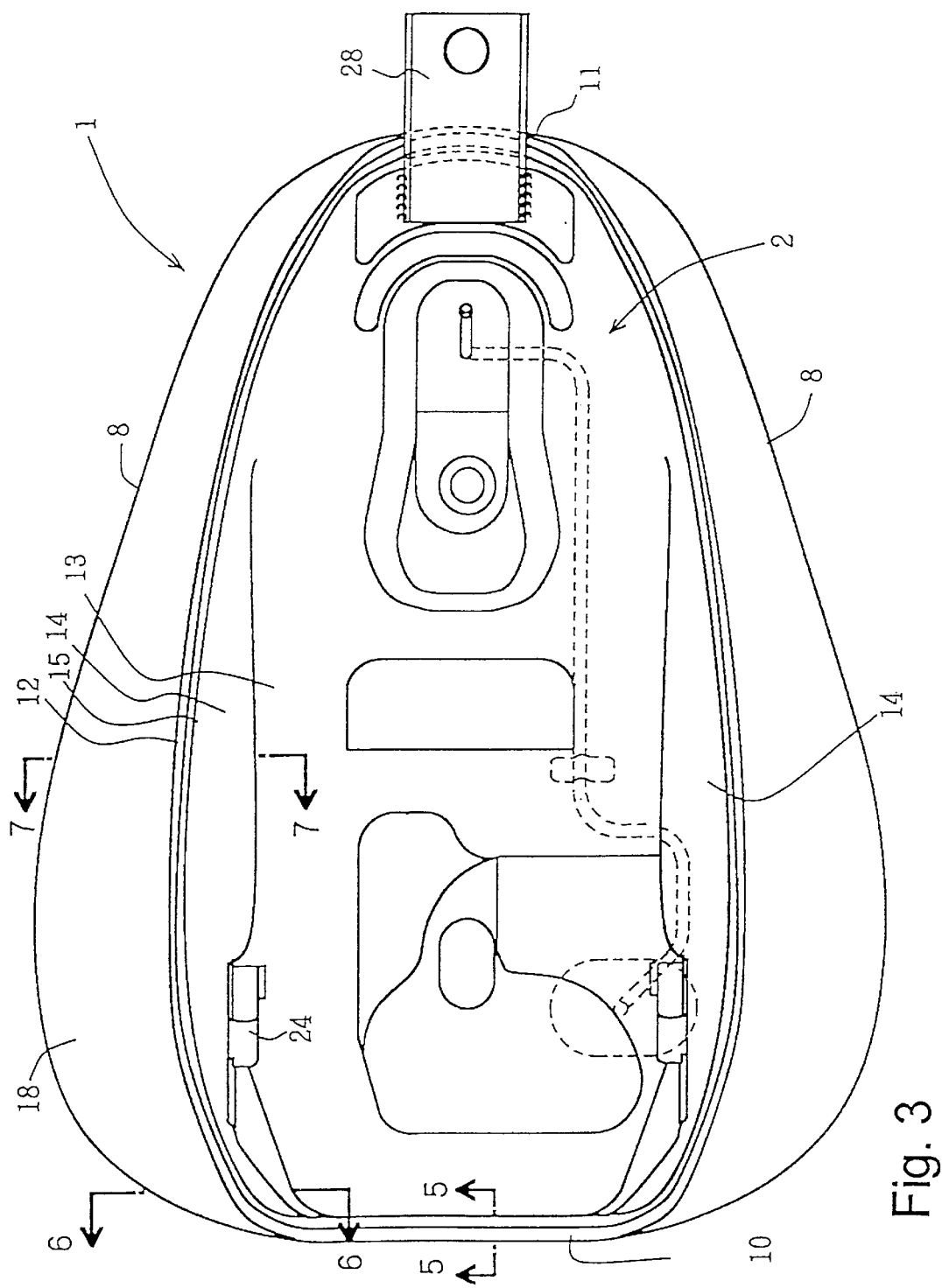
FIG. 3 is a bottom view of the fuel tank of the present invention.
Figure 5:
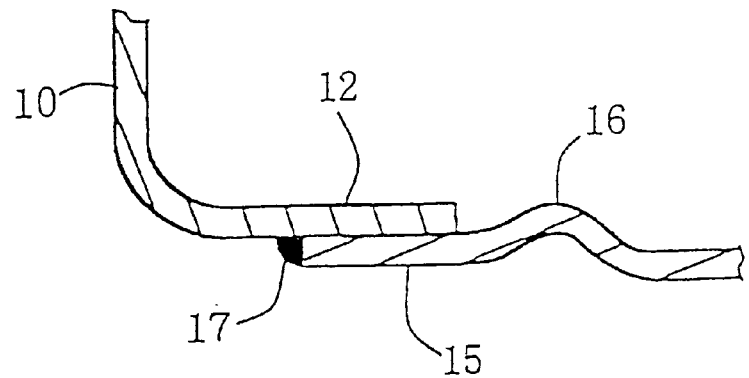
FIG. 5 is an expanded cross-sectional view taken along line 5—5 of FIG. 3.
Figure 6:
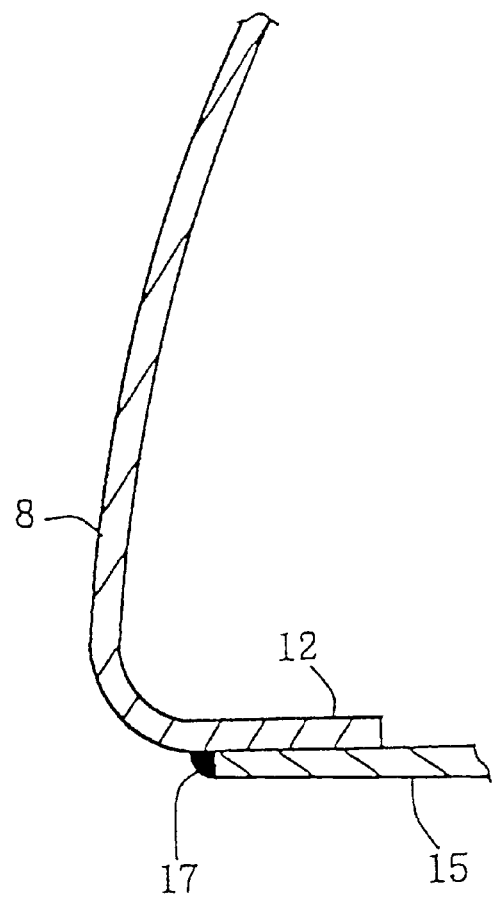
FIG. 6 is an expanded cross-sectional view taken along line 6—6 of FIG. 3.
Figure 7:
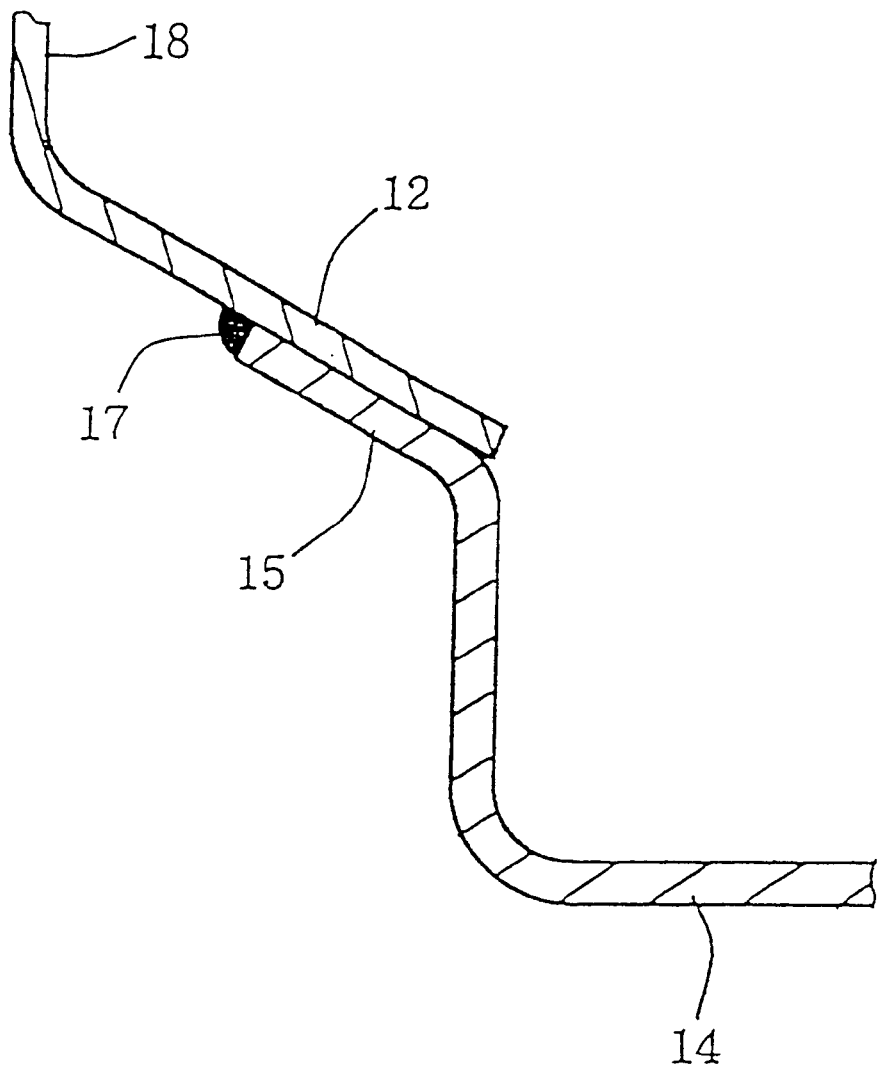
FIG. 7 is an expanded cross-sectional view taken along line 7—7 of FIG. 3.

As shown in FIGS. 1, 5 and 6, the circumferential edge 15 is flat in its forward and rearward ends and corner. A position setting projection 16 protrudes therefrom in a plug-like manner near the extreme end of the connected end 12.

In addition, both right and left side portions of the circumferential edge part 15 are tapered sections extending in an outwardly opened and downward direction to correspond with the connected ends 12 at both tapered right and left sides of the body 1.

A brazing part 17 is formed between the connected end 12 and the circumferential edge 15. Reference numeral denotes a bottom wall 18 of the side chamber 5 defined by the inwardly directed connecting walls forming the connected end part 12.

When this fuel tank is assembled, the bottom member 2 is pushed from below against the body 1. The side part forms a tapered connected section where the connected end part 12 and the circumferential edge 15 correspond to one another, thereby setting them in position in both the right and left directions, and overlapped.

The front-to-back placement of it is set in position by a method wherein the position setting projection 16 contacts the extreme end of the connected end 12 of the body. The connected end part 12 and the circumferential edge 15 are set in position over their entire periphery/circumference and overlapped with one another, and thus the opening 7 is covered by the bottom 2.

Under this condition, the entire circumferences of the overlapped section between the connected end part 12 and the circumferential edge 15 are welded by brazing. In this case, if each of the body 1 and the bottom 2 is made of iron, the brazing material is properly selected.

In the case of applying brazing material, the connected part cannot be supported from inside the fuel tank during the welding operation. However, even this structure can be connected without any problem by forming the connected end part in an inward direction.

However, in addition to brazing as the connecting method, other form of connection may be utilized. For example, welding by melting, such as arc welding or gas welding can be applied, and adhesives may also be utilized.

As described above, since the connecting end 12 of the body is formed toward an inside part of the fuel tank, the connected part between the circumferential edge 15 of the bottom and the connected end 12 of the body is scarcely seen from outside, because the bottom member 2 is fixed from below the opening 7.

In particular, since the connected end 12 is directed upward inside the outer appearance surface at both right and left side walls 8 forming the major outer appearance surface of the fuel tank, the connected part with the circumferential edge 15 of the bottom is placed inside the fuel tank and is not seen at all from the outside.

Accordingly, it is possible to remarkably improve the outer appearance of the fuel tank, and this component becomes preferable as a fuel tank used as an outer appearance-based component, such as a fuel tank for a motorized vehicle.

In addition, as the position setting means, each of the circumferential edge 15 and the connected end part 12 is tapered, and their tapered sections are aligned to each other. The position setting projection 16 is provided so that the connected end 12 of the body and the circumferential edge 15 of the bottom can be overlapped accurately and connected. Thus, their workability can be improved and installation can be simplified.

FIG. 1 shows additional elements which comprise the fuel tank, such as a feeding port cap 20, a filler tube 21, a separator 22, a breather tube 23, a front body fixing stay 24, a small chamber plate 25, a fuel cock connecting small chamber 26, a fuel cock fixing plug 27, and a rear body fixing stay 28.

Figure 8A:
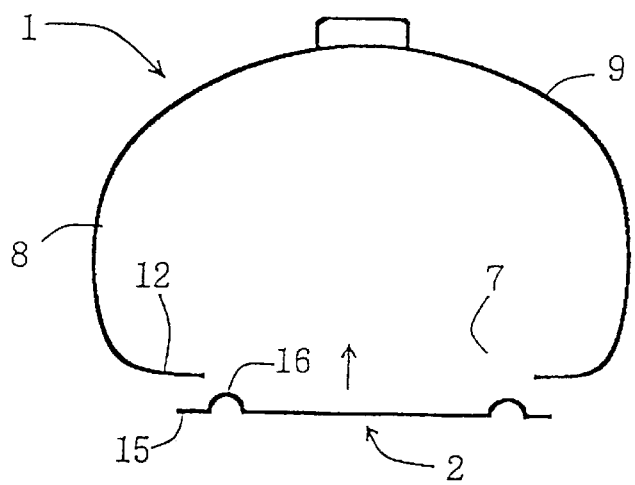
FIGS. 8(A)–8(C) are schematic sectional views showing other preferred embodiments of the present invention.
Figure 8B:
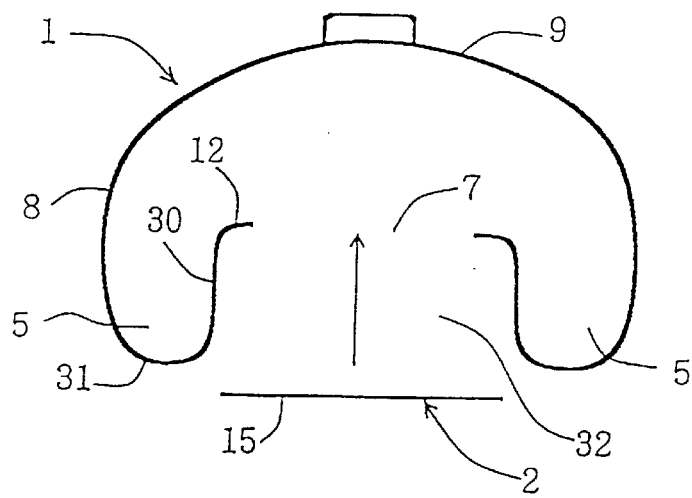
Figure 8C:
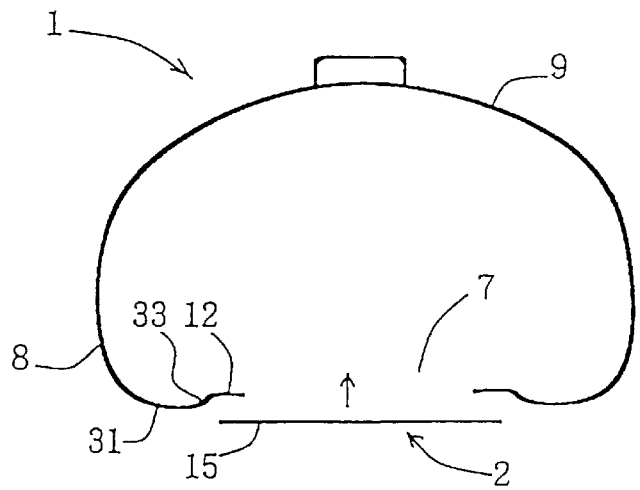

FIGS. 8(A) to 8(C) are schematic cross-sectional views showing other preferred embodiments of the invention. FIG. 8(A) shows a connected end 12 that does not face upward, but is instead bent inwardly at its entire circumference. Also, the circumferential edge 15 of the bottom member 2 is flat at its entire circumference in correspondence with it.

Even with such an arrangement as shown in FIG. 8(A), if the opening 7 is covered from below with the bottom member 2 and at the same time the connected end 12 and the circumferential edge 15 of the bottom are overlapped at their entire circumferences while they are being positioned by the position setting projection 16, and they are connected by the aforesaid proper method, the connected part is scarcely seen from outside, resulting in an outer appearance which is improved.

FIG. 8(B) shows an example where an inner wall 30 extends in a vertical direction inside both right and left side walls 8 in the body 1 so as to form double inner and outer walls. The inner wall 30 is bent inward from the lower ends of both right and left side walls 8 in a continuous manner to form a bottom part 31, where its extreme end side is bent back upward.

The connected end 12 is formed by bending the upper end of the inner wall 30. The opening 7 is opened downwardly into a deep concave space 32 formed by the inner wall 30. The flat plate-like bottom member 2 is located in the concave space 32 while its position is set at the surrounding inner wall 30, the circumferential edge 15 overlaps the connected end 12 and is connected there. With such an arrangement as shown in FIG. 8(B), since the connected end 12 is positioned at higher location than that of the lower ends of both right and left side walls 8 acting as major outer appearance surfaces, the connected part between the connected end 12 and the circumferential edge 15 is not seen at all from outside both right and left side walls 8, resulting in an outer appearance which is improved.

FIG. 8(C) is made such that the lower ends of both right and left side walls 8 are extended in a substantial horizontal inner direction to form a bottom part 31. The opening 7 is formed at its central part, with a circumferential edge of the bottom part 31 enclosing the opening 7, and enters an upper and inner location of the body 1 at a stepped part 33 in a stepwise manner to form the connected end 12.

The degree of step of the stepped part 33 in the bottom part 31 is about equal to the wall thickness of the bottom member 2. The bottom member 2 is stored in the stepped part 33 while its position is set to locate the circumferential edge 15 to be connected to the connected end 12, and the connected part is not seen completely from outside.

The present invention is not limited to each of the aforesaid preferred embodiments, and various modifications can be attained. For example, the position setting means may comprise any one of the taper-aligned structures of the connected end 12 and the circumferential edge 15, the position setting structure having the position setting projection 16, or an inner wall 30 or a stepped part 33.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A fuel tank for a vehicle comprising:
   a main tank member having an upper wall, front and rear walls, right and left sidewalls, and a bottom wall, said bottom wall having an opening therein defined by inwardly directed connecting walls; and
   a bottom member attached to said main tank member for sealing said opening, said bottom member having peripheral edges which overlap a portion of said inwardly directed connecting walls around the entire periphery of said bottom member,
   wherein a central portion of said bottom member and all of said peripheral edges of said bottom member lie in a single plane, said bottom member is substantially flat, and said bottom member is completely flat over an entire surface of said bottom member.

2. The fuel tank according to claim 1, wherein said central portion of said bottom member has a thickness, and said single plane lies completely within said thickness of said bottom member.

3. The fuel tank according to claim 1, wherein a line extending across said upper wall from said right sidewall to said left sidewall crosses no seams in said upper wall.

4. The fuel tank according to claim 1, wherein said bottom member is flat from one of said peripheral edges of said bottom member to every other one of said peripheral edges of said bottom member.

5. The fuel tank according to claim 1, wherein said opening is spaced upwardly from said bottom wall such that peripheral edges of the inwardly directed connecting walls and said peripheral edges of said bottom member are not visible when said fuel tank is viewed from the side.

6. The fuel tank according to claim 1, further comprising interior sidewalls extending at least partially upwardly from said bottom wall.

7. The fuel tank according to claim 1, further comprising a stepped portion extending at least partially upwardly and inwardly from said bottom wall, said inwardly directed connecting walls being formed at interior portions of said stepped portion.

8. The fuel tank according to claim 1, wherein peripheral edges of the inwardly directed connecting walls are not visible when said bottom member is attached to said main tank member.

9. A fuel tank for a vehicle comprising:
   a main tank member having an upper wall, front and rear walls, right and left sidewalls, and a bottom wall, said bottom wall having an opening therein defined by inwardly directed connecting walls; and
   a bottom member attached to said main tank member for sealing said opening, said bottom member having peripheral edges which overlap a portion of said inwardly directed connecting walls around the entire periphery of said bottom member,
   wherein a central portion of said bottom member and all of said peripheral edges of said bottom member lie in a single plane, said bottom member is substantially flat, and said bottom member is flat over an entire surface of said bottom member from one of said peripheral edges of said bottom member to every other one of said peripheral edges of said bottom member.

10. The fuel tank according to claim 9, wherein said central portion of said bottom member has a thickness, and said single plane lies completely within said thickness of said bottom member.

11. The fuel tank according to claim 9, wherein said opening is spaced upwardly from said bottom wall such that peripheral edges of the inwardly directed connecting walls and said peripheral edges of said bottom member are not visible when said fuel tank is viewed from the side.

12. The fuel tank according to claim 11, further comprising interior sidewalls extending at least partially upwardly from said bottom wall.

13. The fuel tank according to claim 11, further comprising a stepped portion extending at least partially upwardly and inwardly from said bottom wall, said inwardly directed connecting walls being formed at interior portions of said stepped portion.

* * * * *